(12) United States Patent
Gong et al.

(10) Patent No.: US 10,038,612 B2
(45) Date of Patent: *Jul. 31, 2018

(54) ENHANCED CARRIER SENSING FOR MULTI-CHANNEL OPERATION

(71) Applicant: Intel Corporation, Santa Clara, CA (US)

(72) Inventors: Michelle X. Gong, Sunnyvale, CA (US); Adrian P. Stephens, Cambridge (GB)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,165

(22) Filed: Nov. 21, 2016

(65) Prior Publication Data
US 2017/0324630 A1    Nov. 9, 2017

Related U.S. Application Data

(63) Continuation of application No. 14/605,662, filed on Jan. 26, 2015, now Pat. No. 9,503,339, which is a continuation of application No. 13/568,563, filed on Aug. 7, 2012, now Pat. No. 8,971,351, which is a continuation of application No. 12/748,678, filed on Mar. 29, 2010, now Pat. No. 8,259,745.

(51) Int. Cl.
| | |
|---|---|
| *H04L 12/413* | (2006.01) |
| *H04L 12/26* | (2006.01) |
| *H04W 72/00* | (2009.01) |
| *H04W 24/08* | (2009.01) |
| *H04W 74/08* | (2009.01) |
| *H04L 1/00* | (2006.01) |

(52) U.S. Cl.
CPC ......... *H04L 43/0811* (2013.01); *H04W 24/08* (2013.01); *H04W 72/005* (2013.01); *H04W 74/0816* (2013.01); *H04L 1/0061* (2013.01)

(58) Field of Classification Search
CPC . H04L 43/08; H04L 43/0805; H04L 43/0811; H04L 43/0817; H04L 1/0061; H04W 24/00; H04W 24/02; H04W 24/04; H04W 24/06; H04W 24/08; H04W 72/005; H04W 72/04; H04W 72/0406; H04W 74/0816

See application file for complete search history.

(56) References Cited

U.S. PATENT DOCUMENTS

| | | | | |
|---|---|---|---|---|
| 6,404,756 | B1 * | 6/2002 | Whitehill | H04L 43/00 370/338 |
| 8,331,397 | B2 * | 12/2012 | Wang | H04W 74/0816 370/310 |
| 2004/0042424 | A1 * | 3/2004 | Hsien-Tsung | H04W 74/0816 370/328 |
| 2007/0105573 | A1 * | 5/2007 | Gupta | H04W 72/0406 455/509 |
| 2008/0171552 | A1 * | 7/2008 | Hyon | H04W 72/0406 455/450 |

(Continued)

*Primary Examiner* — Kevin Mew

(57) ABSTRACT

In various embodiments, a multi-channel request-to-send and a multi-channel clear-to-send may be used in a wireless communications network to assure that a subsequent multi-channel communications exchange between two devices takes place only over channels that are sensed by both devices as being free.

25 Claims, 4 Drawing Sheets

(56) References Cited

U.S. PATENT DOCUMENTS

| | | | |
|---|---|---|---|
| 2010/0054230 A1* | 3/2010 | Sridhara | H04W 72/0406 370/348 |
| 2010/0177757 A1* | 7/2010 | Kim | H04W 74/0816 370/338 |
| 2012/0076073 A1* | 3/2012 | Merlin | H04W 74/0816 370/328 |
| 2012/0113952 A1* | 5/2012 | Kneckt | H04W 72/0406 370/330 |
| 2012/0147804 A1* | 6/2012 | Hedayat | H04W 74/0816 370/312 |
| 2012/0207036 A1* | 8/2012 | Ong | H04W 74/0816 370/252 |
| 2013/0003589 A1* | 1/2013 | Gage | H04J 11/0023 370/252 |
| 2013/0003590 A1* | 1/2013 | Gage | H04W 52/244 370/252 |
| 2013/0195022 A1* | 8/2013 | Nguyen | H04B 1/713 370/329 |
| 2013/0229996 A1* | 9/2013 | Wang | H04W 72/0413 370/329 |
| 2016/0174200 A1* | 6/2016 | Seok | H04W 72/04 370/329 |
| 2017/0231009 A1* | 8/2017 | Wang | H04W 74/0816 |

* cited by examiner

MRTS

| Frame control | Duration | RA | TA | Channel bitmap | FCS |

FIG. 3

MCTS

| Frame control | Duration | RA | Channel bitmap | FCS |

FIG. 4

ENHANCED CARRIER SENSING FOR MULTI-CHANNEL OPERATION

CROSS REFERENCE TO RELATED APPLICATIONS

The present application is a continuation of and claims priority to U.S. patent application Ser. No. 14/605,662, filed on Jan. 26, 2015, which in turn is a continuation of U.S. patent application Ser. No. 13/568,563, filed Aug. 7, 2012, now U.S. Pat. No. 8,971,351 which in turn is a continuation of U.S. patent application Ser. No. 12/748,678, filed on Mar. 29, 2010, now U.S. Pat. No. 8,259,745, all of which are entitled "ENHANCED CARRIER SENSING FOR MULTI-CHANNEL OPERATION" and all of which are incorporated herein by reference in their entirety.

BACKGROUND

For wireless communications networks operating under various standards, a device may sometimes transmit simultaneously over multiple channels, therefore increasing the amount of data that may be transmitted in a specified time period. Before making such a multi-channel transmission, a device may sense whether any of those narrow channels are currently busy. However, a channel that is sensed as free by the intended transmitter may be sensed as busy by the intended receiver due to the so-called hidden node problem (for example, a receiver at the edge of the current network may be able to hear signals from a device in a neighboring network that aren't strong enough to reach the transmitter of the current network). If the transmitter goes ahead and transmits because it isn't aware of that hidden node, the receiver may not be able to correctly receive the transmission due to interference from the neighboring device on any of those channels. Networks that exclusively use a single channel for communication may use a Request-to-Send/Clear-to-Send (RTS/CTS) exchange for avoiding the hidden-node problem, but in these exchanges both RTS and CTS are transmitted on a single channel. If the interfering signal is on one of the other channels that are contained in the transmission, the transmitter will not be aware of it and will transmit a signal that probably won't be received.

BRIEF DESCRIPTION OF THE DRAWINGS

Some embodiments of the invention may be understood by referring to the following description and accompanying drawings that are used to illustrate embodiments of the invention. In the drawings:

FIG. 3 shows the format of an MRTS, according to an embodiment of the invention.

FIG. 4 shows the format of an MCTS, according to an embodiment of the invention.

DETAILED DESCRIPTION

Figure 1:
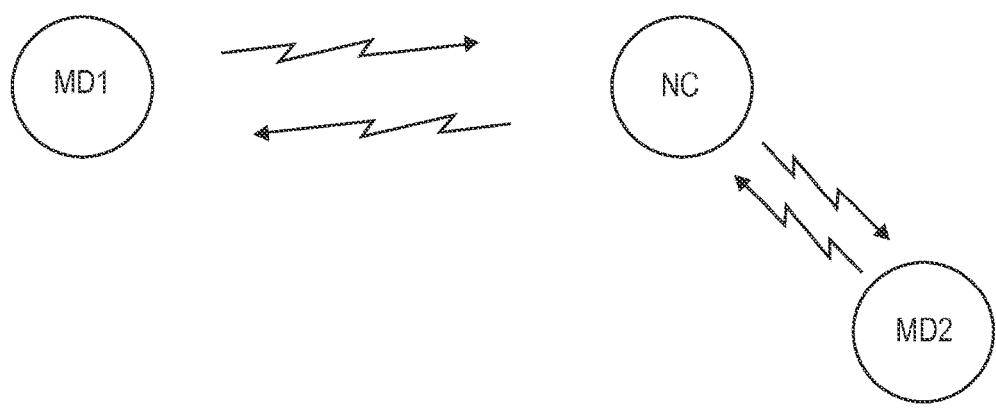
FIG. 1 shows wireless devices communicating with each other in a wireless communications network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. A wireless device may comprise at least one antenna, at least one radio, and at least one processor, where the radio's transmitter transmits signals through the antenna that represent data and the radio's receiver receives signals through the antenna that represent data, while the processor may process the data to be transmitted and the data that has been received. The processor may also process other data which is neither transmitted nor received.

The term "network controller" (NC) is intended to mean a device that schedules and controls, at least partially, wireless communications by other devices in the network. A network controller may also be known as a base station (BS), access point (AP), central point (CP), or any other term that may arise to describe the functionality of a network controller. In a multi-channel network, a number of channels may generally be available to use for communications between devices in the network. These available channels may be specified by industry standard, by government regulations, by the limitations of the network devices themselves, or through any other feasible means. Of the available channels, the NC may select which ones may be used in a specific communication between two specific devices in the network. The NC may change this selection from time to time as it deems appropriate.

The term "mobile device" (MD) is intended to mean a device whose wireless communications are at least partially scheduled and controlled by the network controller. A mobile device may also be known as a mobile node, a STA, a subscriber station (SS), user equipment (UE), or any other term that may arise to describe the functionality of a mobile device. Mobile devices may move during such communications, but movement is not required.

The term "free channel" is intended to mean a channel that has been determined as not being in use, as sensed by the device making the determination, and therefore may be available for use by that device. In various embodiments, the determination may be made by monitoring the amount of electromagnetic energy sensed on that channel, by trying to decode data that has been encoded on that channel, or by any other feasible means that would indicate that the sensing device could use the channel for communications without a high likelihood of interference. In some situations, when two devices are to communicate with each other, it is possible that one device may sense a channel as free but the other device will sense the channel as busy, because of their relative distances from the device that is already using that channel.

The term multi-channel request-to-send (MRTS) is intended to mean a request-to-send (RTS) that requests a reservation for multiple channels. A multi-channel clear-to-send (MCTS) is intended to mean a clear-to-send (CTS) that agrees to a reservation for one or more multiple channels in response to an MRTS. Just as an RTS/CTS exchange may be used to reserve a single channel, an MRTS/MCTS exchange may be used to reserve multiple channels for the same period of time.

In various embodiments, a first wireless device may transmit an MRTS to a second wireless device indicating which of multiple channels are sensed as free by the first device. The second device may reply with an MCTS that indicates which of those free channels are also sensed as free by the second device. After this MRTS/MCTS exchange, the first device will have a list of available channels that are sensed as free by both devices, and the hidden node problem may thereby be avoided in a subsequent multi-channel communication by using only those channels that are sensed as free by both devices.

FIG. 1 shows wireless devices communicating with each other in a wireless communications network, according to an embodiment of the invention. In the illustrated example, one device is shown as a network controller (NC), while the devices communicating with it are shown as mobile devices (MD1, MD2), but in some networks devices may communicate with each others in a peer relationship. Although only two MDs are shown, in some embodiments there may be additional MD's in the network that are also able to communicate with the NC.

Figure 2:
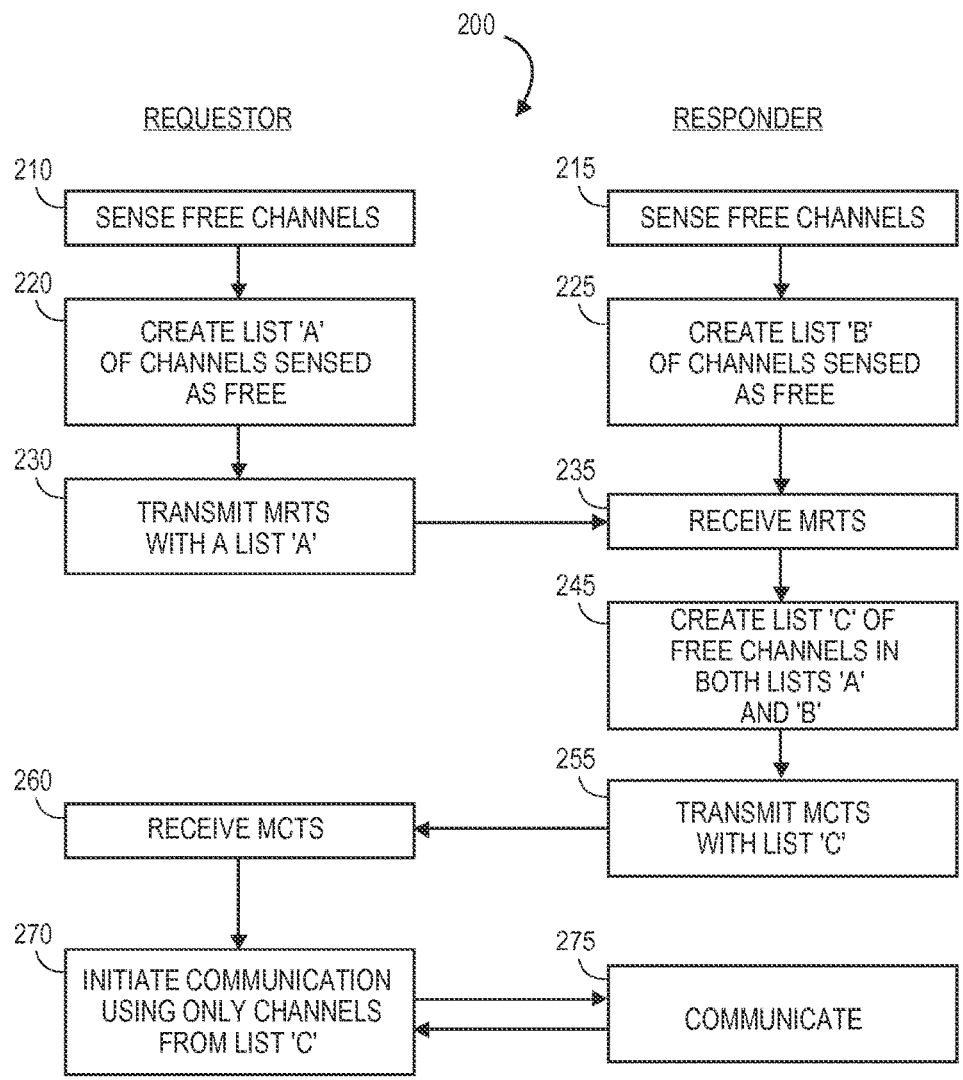
FIG. 2 shows a flow diagram of communications between two devices, according to an embodiment of the invention.

FIG. 2 shows a flow diagram of communications between two devices, according to an embodiment of the invention. In flow diagram 200, the two devices are labeled as a requestor and a responder. Each device may transmit and receive at different times during the exchange. For this document, the device that requests the communication (by transmitting an MRTS) is called the requestor, and the device that responds to that request (by transmitting an MCTS) is called the responder. In some instances, the responder may deny the request (e.g., by not responding, by indicating no channels are free, or by any other feasible means), but the description here assumes that the responder accepts the request. In some embodiments the requestor may be an MD and the responder may be an NC, but in other embodiments those roles are reversed, and in some other embodiments both devices may be peer devices.

At 210 the requestor may sense the various channels that are available to it to determine which channels are currently free. In some embodiments this may happen during a 'contention' period in the network during which the devices are allowed to contend for the medium. At 220 the requestor may make a list (e.g., list A) of the channels that are currently free, and at 230 it may transmit this list to the responder in an MRTS. The list may take any feasible form, and it may be represented in the MRTS in any feasible manner. Possible formats are discussed later in more detail. In some instances, for various reasons, the requestor may limit this list to a subset of the channels that were sensed as being free. For the purposes of this description, the list of free channels is the list of channels indicated by the MRTS as being free, even if more channels could have been included in the list.

In the meantime, at 215 the responder may also sense the various channels that are available to it to determine which channels are currently free. In many instances, the 'available channels' will be the same for both devices, but sometimes this may not be the case. At 225 the responder may make a list (e.g., list B) of the channels that are currently free, and at 235 it may receive the MRTS that was transmitted by the requestor.

In some embodiments, a device may frequently monitor the various available channels and keep an ongoing list of which channels are free. This technique is implied by the order of operations shown in FIG. 2. In other embodiments, a device may not examine the channels in this way until it needs to know that information. For example, the requestor may not sense the channels until it determines that it is going to transmit something (e.g., the MRTS), and the responder may not sense the channels until it receives the MRTS. This choice may depend largely on how quickly that information must be obtained. If the responder must begin transmitting its respond within a few microseconds, but it takes a few hundred microseconds to sense whether the channels are free, then previous scanning of the channels may be preferable.

After receiving the MRTS, the responder may compare its own list B with list A, and produce a list C that lists only the channels that were indicated as free in both list A and list B. List C thus represents the channels that were determined to be free at both the requestor and the responder locations. At 255, list C may then be transmitted back to the requestor in an MCTS, which the requestor receives at 260. Now that the requestor has a list of channels that are deemed free by both devices, at 270 the requestor may initiate a communication with the responder that takes place at 270 and 275, using only channels that are contained in list C. All or only some of the channels in list C may be selected for this communication, and the selection may be changed during the communication. In some embodiments, each device may select which of the channels from list C are to be used in the current transmission. Any feasible technique may be used to notify the receiving device of which channels are being selected by the transmitting device.

Although described as a 'list', the indication of which channels were sensed as free may be formatted in any feasible manner. In one embodiment, a bitmap may be used in which each available channel is represented by a bit in the bitmap, and the state of each bit indicates whether the associated channel is free or not. This bitmap may then be placed into a particular field in the MRTS and/or MCTS. Other embodiments may use any other feasible formatting technique to convey this information.

FIG. 3 shows the format of an MRTS, according to an embodiment of the invention. In the illustrated embodiments of FIG. 3, the MRTS is formatted as a control frame. The contents of the Frame Control field may indicate it is an MRTS. The contents of the Duration field may indicate how long the current exchange of information is expected to take, which may include the current MRTS frame, the responding MCTS frame, an ACK frame, and a predetermined number of interframe spacing (IFS) delays. This value may serve as a reservation notice to other devices that can receive it that the channel is to be reserved for the indicated time period, and those other devices should reframe from transmitting during that time (other than the device addressed by this frame as the intended receiver).

The contents of the RA field may indicate the address of the receiving device, i.e., the responder device for whom this MRTS is intended. Similarly, the TA field may indicate the address of the transmitting device, i.e., the requestor device that is transmitting this MRTS. The Channel Bitmap field may contain list A, that is, the channels that are designated by the transmitting device as being free. The FCS field may contain a frame checksum value to verify that the frame as received was not corrupted.

FIG. 4 shows the format of an MCTS, according to an embodiment of the invention. In the illustrated embodiments of FIG. 4, the MCTS is also formatted as a control frame. The contents of the Frame Control field may indicate it is an MCTS. The contents of the Duration field may indicate how long the remainder of the current exchange of information is expected to take, which may include the current MCTS frame, an ACK frame, and a predetermined number of interframe spacing (IFS) delays. As with the MRTS, this value may serve as a reservation notice to other devices that can receive it that the channel is to be reserved for the indicated time period, and those other devices should reframe from transmitting during that time (other than the requestor device addressed by this frame as the intended receiver).

Because of physical distances, obstructions, localized interferences, etc., the set of devices that can receive the MCTS frame may be different than the set of devices that can receive the MRTS frame, so both sets of devices may be notified of how long to refrain from transmitting by reading the contents of the Duration field from whichever transmission it can receive. For those devices that can receive both, the MCTS Duration field may be used to verify or update the value previously obtained from the MRTS Duration field.

The contents of the RA field may indicate the address of the receiving device, i.e., the requestor device for whom this MCTS is intended. Since only the device addressed in the MRTS should respond with an MCTS, there may be no TA field—the receiving device may simply assume that the device responding to the MRTS is the same device that was indicated by the RA field in the MRTS. The Channel Bitmap field may contain list C, that is, the list A channels that were also sensed as being free by the responder. As before, the FCS field may contain a frame checksum value to verify that the frame as received was not corrupted.

These example formats were shown because they closely conform to the overall RTS and CTS formats that are already in use for single channel operation (except of course for the Channel Bitmap field). But this free-channel information may be transmitted in any convenient format and still fall within the scope of various embodiments of the invention.

Figure 5:
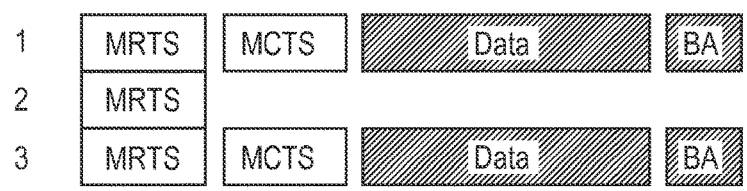
FIG. 5 shows a communication sequence, according to an embodiment of the invention.

FIG. 5 shows a communication sequence, according to an embodiment of the invention. In the example of FIG. 5, the requestor may transmit an MRTS listing 3 channels as free, and the MRTS may be simultaneously transmitted over each of those three channels (shown as channels 1, 2 and 3, although they may be identified in any feasible way). The responder may determine that channels 1 and 3 are free while channel 2 is busy, so it may transmit an MCTS showing only channels 1 and 3 are free, and it may simultaneously transmit that MCTS over channels 1 and 3. Now that the requestor has the list of channels that are free at both locations, it may begin transmitting the data to the responder over channels 1 and 3, and the responder may transmit an acknowledgement BA over both of those channels to indicate that the data was received correctly on both channels.

Figure 6:
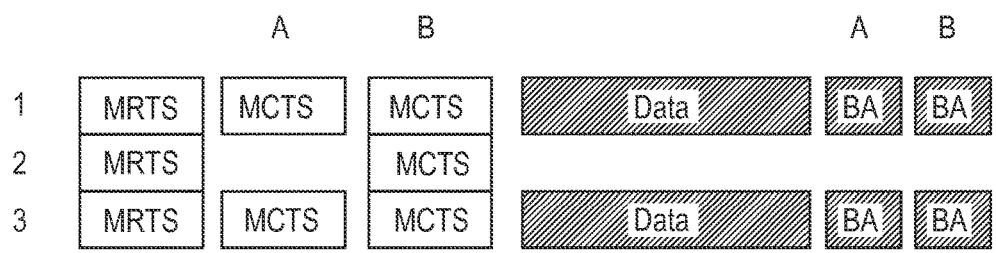
FIG. 6 shows a communication sequence involving multiple responders, according to an embodiment of the invention.

FIG. 6 shows a communication sequence involving multiple responders, according to an embodiment of the invention. In some networks, the requestor may want to transmit data to multiple responders in the same communications sequence, and the MRTS may therefore be addressed to multiple responders. Such multiple addressing may be handled in various ways, such as but not limited to multicast addressing. To keep from interfering with each other, the responders may transmit their MCTS's at different times.

In the example shown, the requestor senses that channels 1, 2, and 3 are free, and transmits an MRTS to responders A and B on each of channels 1, 2, and 3. If Responder A senses that only channels 1 and 3 are free, or correctly receives the MRTS only on, channels 1 and 3, the Responder A transmits an MCTS indicating that channels 1 and 3 are free on each of channels 1 and 3. Responder B senses that channels 1, 2, and 3 are all free, and transmits an MCTS indicating that on each of channels 1, 2, and 3. The requestor now knows that transmitting the data on channel 2 would be acceptable at responder B, but it might cause interference at responder A. So it transmits the data to both responders only on channels 1 and 3. As with the MCTS's, each responder may transmit its acknowledgement BA's at a different time.

In some embodiments, a particular channel called the primary channel must be used in every multi-channel communication. In this situation, the primary channel must be used when transmitting the MRTS, the MCTS, and the subsequent data. Therefore, if the primary channel is sensed as busy by the requestor, the MRTS may not be transmitted. If the primary channel is sensed as busy by the responder the MCTS and the subsequent data may not be transmitted.

In some networks, the devices may communicate using multi-user multiple input multiple output (MU MIMO), in which different "spatial channels" may be used to transmit different signals to different devices over the same frequency channel, without interference. (In this document, the term 'channel' is assumed to mean a frequency channel unless specifically identified as a spatial channel.) In such cases, each spatial channel may use the techniques previously described, without concern for whether the same channels are simultaneously being used on another spatial channel.

As previously implied, one purpose of the MRTS and MCTS frames is to notify non-participating devices (devices that are neither the requestor nor the responders) that certain channels are being reserved for a specified period of time, and those non-participating devices should refrain from transmitting on those channels during that time. The Duration field in both the MRTS and MCTS serve that purpose, and when a non-participating device receives one of those frames it can set it's network allocation vector (NAV) to a certain time to let it know not to transmit on the indicated channel(s) during that time. If it is able to receive the MCTS, it can use the list in the MCTS duration field as the indicator of which channels to avoid since the requestor will be guided by that list for subsequent transmissions rather than by the potentially-larger MRTS list.

However, some non-participating devices may be able to receive the MRTS but not the MCTS. Such a device might set it's NAV for a channel that is not going to be used because the responder sensed it as busy when the requestor did not. To avoid unnecessarily avoiding a channel that it could otherwise use, a non-participating device may follow the practice of potentially resetting its NAV after a certain time period if the NAV was set based on an MRTS but the corresponding MCTS was not received. This time period may be long enough to receive any CTS, but not long enough to wait for the entire Data transmission period. In one embodiment, the time to wait may be expressed as:

$$(2\ SIFSTimes)+(TXTIMEMCTS)+(PHY\text{-}RX\text{-}START\ Delay)+(2\ slot\ times)$$

where SIFSTime is the duration of a short interframe space, TXTIMEMCTS is the time to transmit the MCTS, PHY-RX-START Delay is a required delay to wait before receiving, and the slot times are predefined. Whichever delay formula is used, it should be at least long enough to reach the Data phase. If the medium is busy after that delay period, then the device may assume the original duration period obtained from the MRTS is still valid, and not reset its NAV.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising:
   a processor;
   a memory; and
   an access point (AP) comprising logic, at least a portion of which is in hardware, the logic to:
      transmit a multi-channel request-to-send (MRTS) reserving multiple channels sensed as being free by the AP, the MRTS addressed to a plurality of stations (STAs); and
      process a multi-channel clear-to-send (MCTS) received from a STA comprised among the plurality of STAs, the MCTS to comprise free channel information for a determination of one or more channels to be utilized for one or more multi-user multiple-input multiple-output (MU-MIMO) transmissions of the AP, the MCTS to identify one or more channels sensed as free by the STA, the one or more channels to comprise a subset of the multiple channels sensed as being free by the AP.

2. The apparatus of claim 1, the MRTS addressed to the plurality of STAs using multicast addressing.

3. The apparatus of claim 1, the MRTS to comprise a bitmap to indicate the multiple channels sensed as being free by the AP.

4. The apparatus of claim 1, the MCTS to comprise a bitmap to indicate the one or more channels sensed as free by the STA.

5. The apparatus of claim 1, the MRTS formatted as a control frame.

6. The apparatus of claim 1, the MRTS to comprise a duration field to indicate a time period during which devices other than the plurality of STAs should refrain from transmitting.

7. The apparatus of claim 1, the MRTS transmitted over each of the multiple channels simultaneously.

8. The apparatus of claim 1, comprising at least one radio.

9. The apparatus of claim 8, comprising one or more antennas.

10. At least one non-transitory computer-readable storage medium comprising a set of instructions that, in response to being executed at an access point (AP), cause the AP to:
    transmit a multi-channel request-to-send (MRTS) reserving multiple channels sensed as being free by the AP, the MRTS addressed to a plurality of stations (STAs); and
    process a multi-channel clear-to-send (MCTS) received from a STA comprised among the plurality of STAs, the MCTS to comprise free channel information for a determination of one or more channels to be utilized for one or more multiple-input multiple-output (MU-MIMO) transmissions of the AP, the MCTS to identify one or more channels sensed as free by the STA, the one or more channels to comprise a subset of the multiple channels sensed as being free by the AP.

11. The at least one non-transitory computer-readable storage medium of claim 10, the MRTS addressed to the plurality of STAs using multicast addressing.

12. The at least one non-transitory computer-readable storage medium of claim 10, the MRTS to comprise a bitmap to indicate the multiple channels sensed as being free by the AP.

13. The at least one non-transitory computer-readable storage medium of claim 10, the MCTS to comprise a bitmap to indicate the one or more channels sensed as free by the STA.

14. The at least one non-transitory computer-readable storage medium of claim 10, the MRTS formatted as a control frame.

15. The at least one non-transitory computer-readable storage medium of claim 10, the MRTS to comprise a duration field to indicate a time period during which devices other than the plurality of STAs should refrain from transmitting.

16. The at least one non-transitory computer-readable storage medium of claim 10, comprising instructions that, in response to being executed at the AP, cause the AP to transmit the MRTS over each of the multiple channels simultaneously.

17. The at least one non-transitory computer-readable storage medium of claim 10, the MCTS transmitted simultaneously over each of the one or more channels sensed as free by the STA.

18. A method, comprising:
    transmitting, from an access point (AP), a multi-channel request-to-send (MRTS) reserving multiple channels sensed as being free by the AP, the MRTS addressed to a plurality of stations (STAs); and
    processing a multi-channel clear-to-send (MCTS) received from a STA comprised among the plurality of STAs, the MCTS to comprise free channel information for a determination of one or more channels to be utilized for one or more multiple-input multiple-output (MU-MIMO) transmissions of the AP, the MCTS to identify one or more channels sensed as free by the STA, the one or more channels to comprise a subset of the multiple channels sensed as being free by the AP.

19. The method of claim 18, the MRTS addressed to the plurality of STAs using multicast addressing.

20. The method of claim 18, the MRTS to comprise a bitmap to indicate the multiple channels sensed as being free by the AP.

21. The method of claim 18, the MCTS to comprise a bitmap to indicate the one or more channels sensed as free by the STA.

22. The method of claim 18, the MRTS formatted as a control frame.

23. The method of claim 18, the MRTS to comprise a duration field to indicate a time period during which devices other than the plurality of STAs should refrain from transmitting.

24. The method of claim 18, comprising transmitting the MRTS over each of the multiple channels simultaneously.

25. The method of claim 18, the MCTS transmitted simultaneously over each of the one or more channels sensed as free by the STA.

* * * * *